UNITED STATES PATENT OFFICE.

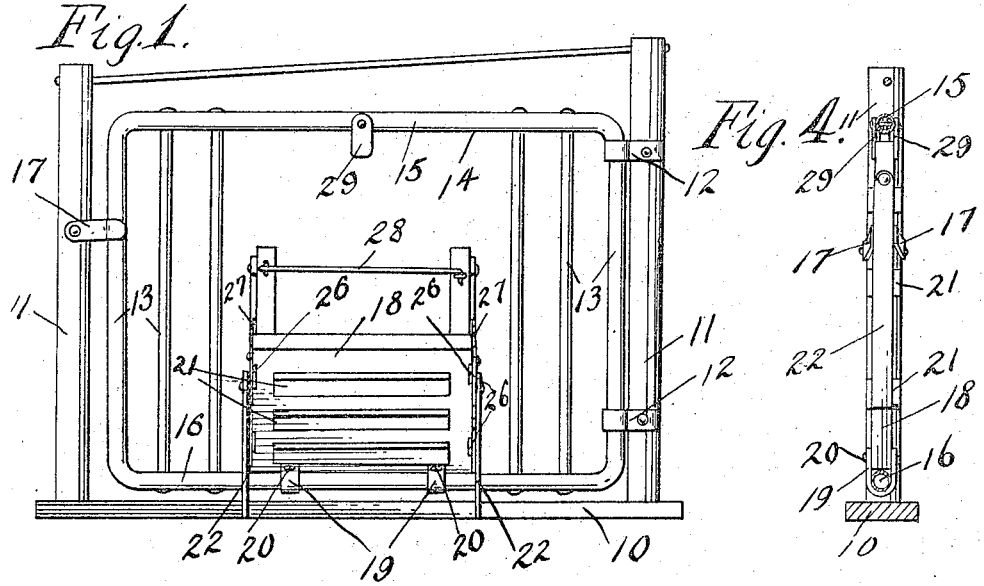
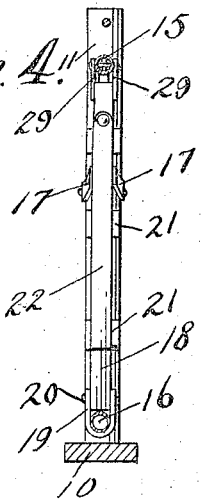
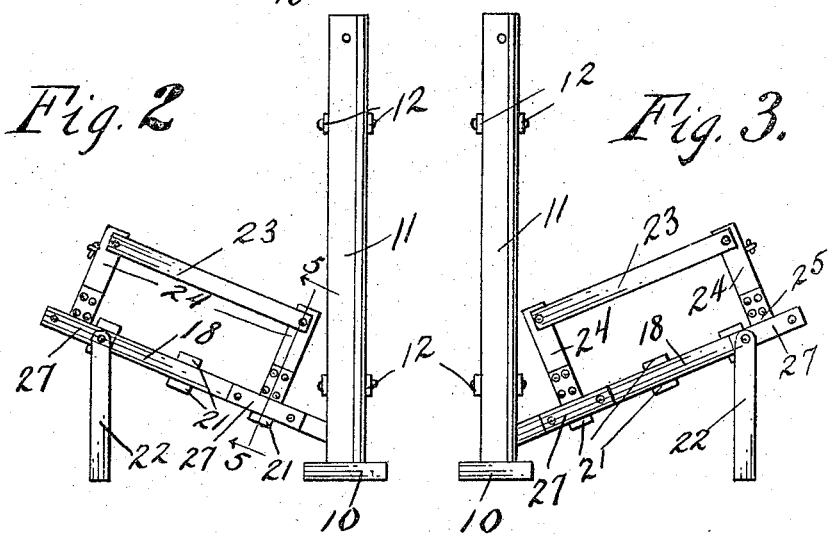
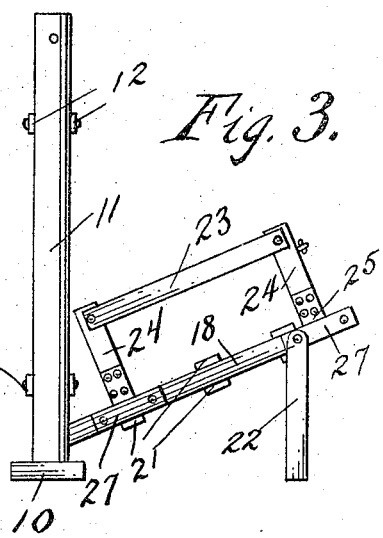
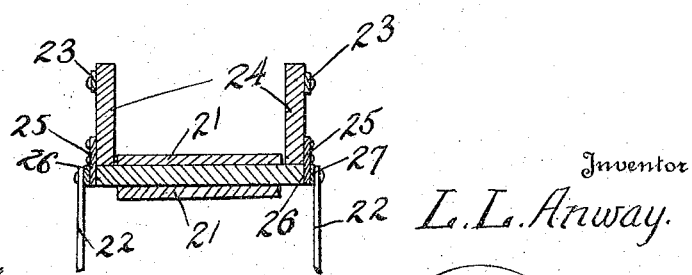

LEW L. ANWAY, OF GENEVA, IOWA.

RUNWAY ATTACHMENT FOR GATES.

1,242,757. Specification of Letters Patent. Patented Oct. 9, 1917.

Application filed March 22, 1917. Serial No. 156,698.

*To all whom it may concern:*

Be it known that I, LEW L. ANWAY, a citizen of the United States, residing at Geneva, in the county of Franklin, State of Iowa, have invented certain new and useful Improvements in Runway Attachments for Gates; and I do hereby declare the following to be a full, clear, and exact description of the invention, such as will enable others skilled in the art to which it appertains to make and use the same.

This invention is an improvement in gates adapted for use in stock yards, railway cars and the like and has particular reference to a runway attachment therefor.

An object of the invention is the provision of a runway pivotally connected to the gate in such manner as to enable the same to be swung to both sides of the gate when loading or unloading stock.

Another object is to provide a runway which may be utilized as a partial closure for the gate when the same is not in use.

The inventive idea involved is capable of receiving a variety of mechanical expressions, one of which, for the purpose of illustrating the present invention, is shown in the accompanying drawing, wherein:—

Figure 1 is a front elevation of a gate showing the runway attached thereto and in operative position.

Fig. 2 is a side elevation showing the runway in operative position on one side of the gate.

Fig. 3 is a similar view showing the runway on the opposite side of the gate.

Fig. 4 is a vertical transverse sectional view.

Fig. 5 is a section on the line 5—5 of Fig. 2.

Referring more particularly to the accompanying drawing in which like reference characters indicate similar parts the numeral 10 indicates the base of the gate frame having the standards 11 mounted thereon one of which carries the pivot members 12 for receiving the adjacent transverse end bar 13 of a gate which is generally indicated by the numeral 14. This gate comprises upper and lower horizontal bars or members 15 and 16 connected by a plurality of spaced transverse bars including the ends bars 13. The standard 11 opposite to which the gate is pivoted is provided with a latch 17 for engaging the adjacent end bar 13 when the gate is in closing position.

The runway which comprises one of the essential features of the invention is shown in what is believed to be its preferred form and comprises a base or platform 18 of rectangular formation having one end pivotally connected to the lower horizontal bar 16 of the gate by means of the U-shaped clips 19 detachably secured to said platform by bolts 20. Both sides of the platform 18 are provided with transverse cleats 21 to prevent the animal from slipping as the same pass up and down the runway, and the free end of said paltform is supported by the legs 22 which are pivotally connected to the longitudinal edges thereof. When not in use, the legs or supports may be swung to a position extending longitudinally of the edges of the platform.

The platform 18 is preferably provided with side rails 23 secured at each end to the posts 24, each of which is provided at its lower end with a projecting supporting arm 25 which, when the side rails are in position, is adapted to detachably engage in an adjacent socket 26 formed in one of the longitudinal edges of the platform by means of a plate 27. The posts 24 at the free end of the platform are provided with a latch 28 for closing the runway when desired.

Should the runway be in an operative position as shown in Fig. 2 and it is desired to adjust the same to the other side of the gate, it is only necessary to remove the side rails 23 by detaching the arms 25 from the sockets 26 and then swing the platform about its pivot and between the intermediate transverse bars of the gate to the other side thereof, as shown in Fig. 3, whereupon the side rails may again be mounted in position. When the platform is not in use the side rails may be detached and the supporting legs swung to their inoperative position and the platform then adjusted to a substantially vertical position between said intermediate transverse bars of the gate, as shown in Fig. 4, after which each side of the platform may be engaged by the pivoted latches 29 carried by the upper horizontal bar 15 of the gate whereupon said platform will close the space between said intermediate bars and thus form a partial closure for the gate.

What is claimed is:—

1. The combination with a gate including upper and lower horizontal bars, spaced transverse bars connecting said horizontal bars, of a runway associated with said gate and consisting of a platform pivotally connected to the lower horizontal bar thereof and adapted to be swung to either side of said gate through the space between certain of said transverse bars.

2. The combination with a gate including upper and lower horizontal bars, spaced transverse bars connecting said horizontal bars, of a runway associated with said gate and consisting of a platform pivotally connected to the lower horizontal bar thereof and adapted to be swung to either side of said gate through the space between certain of said transverse bars, and supporting legs for said platform pivotally connected to the outer end thereof.

3. The combination with a gate including upper and lower horizontal bars, spaced transverse bars connecting said horizontal bars, of a runway associated with said gate and consisting of a platform pivotally connected to the lower horizontal bar thereof and adapted to be swung to either side of said gate through the space between certain of said transverse bars, supporting legs for said platform pivotally connected to the outer end thereof, and detachable side rails for said platform.

4. The combination with a gate including upper and lower horizontal bars, spaced transverse bars connecting said horizontal bars, of a runway associated with said gate and consisting of a platform pivotally connected to the lower horizontal bar thereof and adapted to be swung to either side of said gate through the space between certain of said transverse bars, supporting legs for said platform pivotally connected to the outer end thereof, said platform having sockets upon its longitudinal edges, side rails for said platform, posts for supporting said rails, and arms carried by said posts for detachable engagement with said sockets whereby to support said posts in position.

5. The combination with a gate including upper and lower horizontal bars, spaced transverse bars connecting said horizontal bars, of a runway associated with said gate and consisting of a platform pivotally connected to the lower horizontal bar thereof and adapted to be swung to either side of said gate through the space between certain of said transverse bars, supporting legs for said platform pivotally connected to the outer end thereof, and latch members carried by the upper horizontal bar of said gates for engaging said platform to retain the same in a vertical and inoperative position.

In testimony whereof, I affix my signature in the presence of two witnesses.

LEW L. ANWAY.

Witnesses:
O. J. CLOCK,
OMER J. THOMPSON.

Copies of this patent may be obtained for five cents each, by addressing the "Commissioner of Patents, Washington, D. C."